Aug. 27, 1968  V. A. ERICKSON ET AL  3,398,865
PLANTER WITH ROTARY AGITATOR
Filed June 14, 1967  2 Sheets-Sheet 1
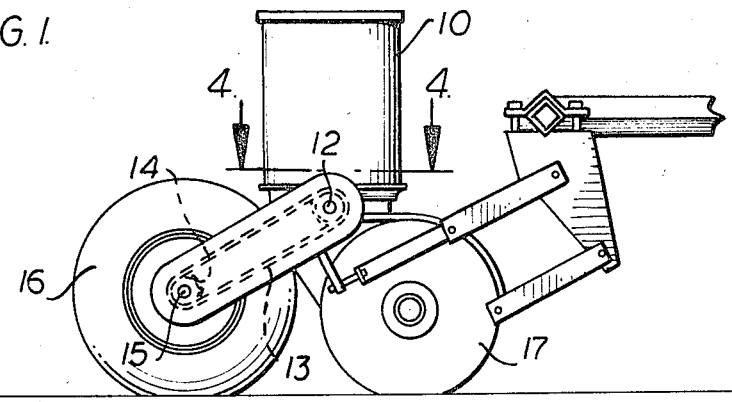
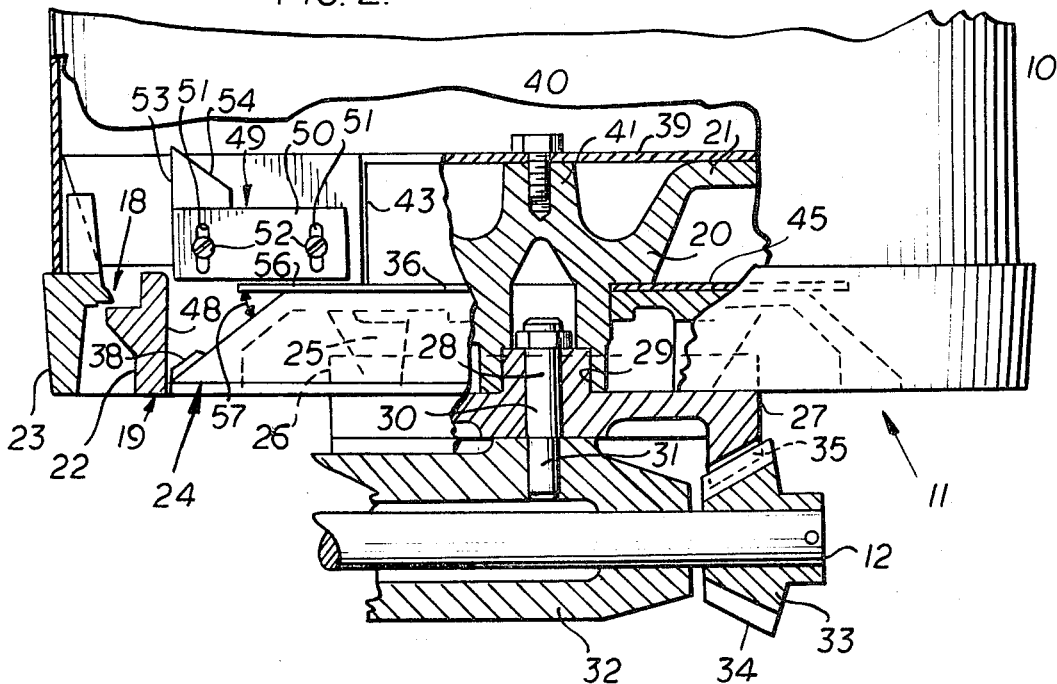
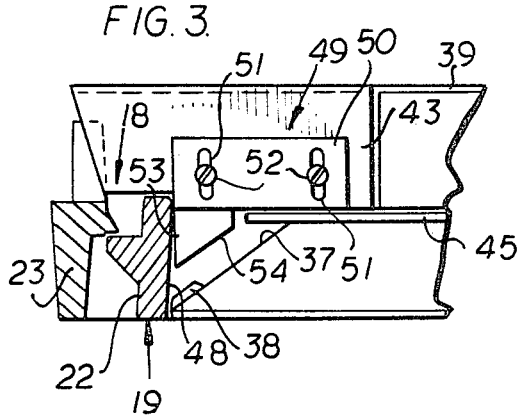
INVENTORS
VEDICK A. ERICKSON
DANIEL HENRY
DARLO E. LIENEMANN
ATTY

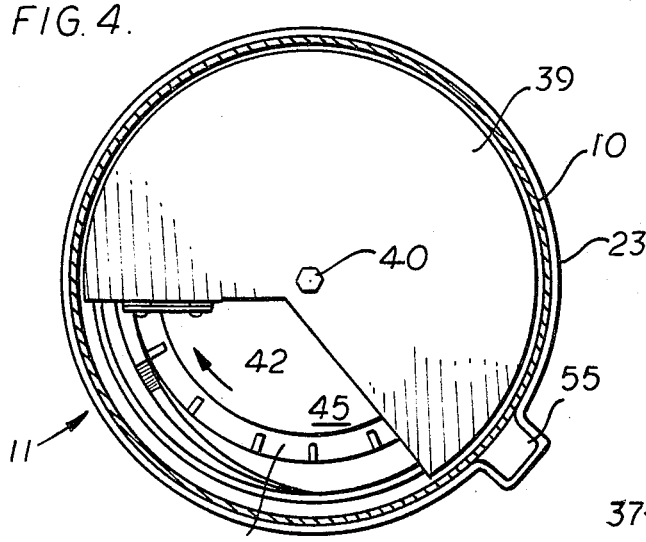
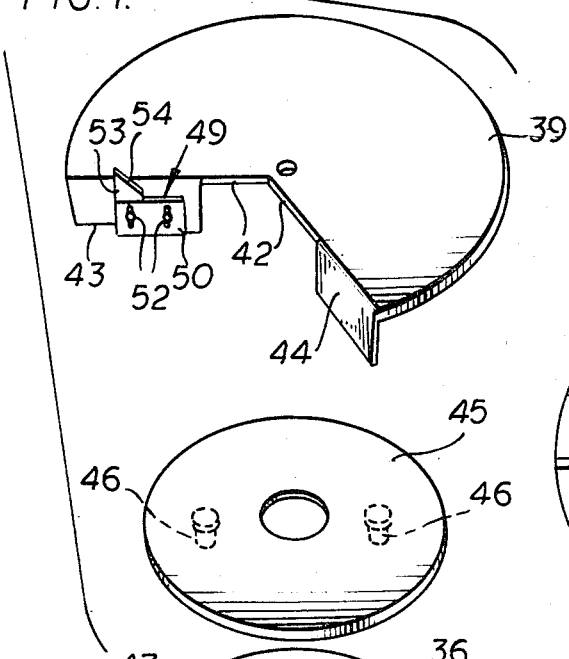
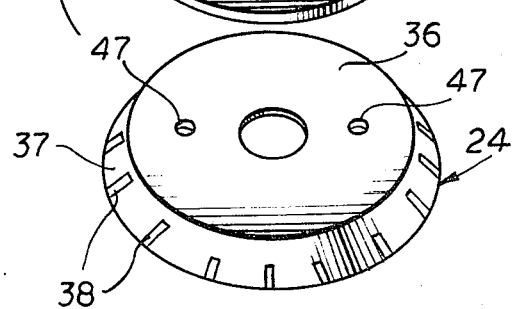
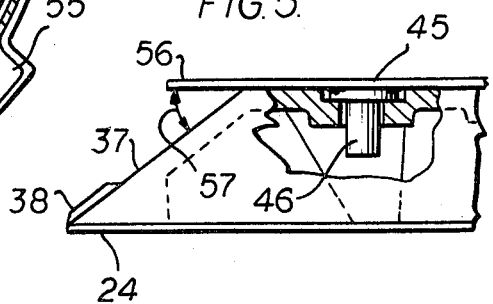
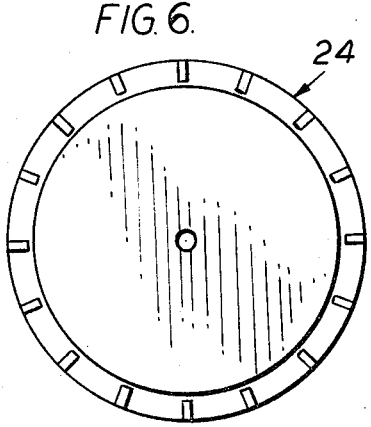
INVENTORS
VEDICK A. ERICKSON
DANIEL HENRY
DARLO E. LIENEMANN
ATTY

United States Patent Office 3,398,865
Patented Aug. 27, 1968

3,398,865
PLANTER WITH ROTARY AGITATOR
Vedick A. Erickson, Naperville, Daniel Henry, Downers Grove, and Darlo E. Lienemann, Clarendon Hills, Ill., assignors to International Harvester Company, Chicago, Ill., a corporation of Delaware
Filed June 14, 1967, Ser. No. 646,031
8 Claims. (Cl. 222—317)

ABSTRACT OF THE DISCLOSURE

A seed dispensing arrangement in a planter hopper includes a horizontal rotatable seed plate having a downwardly inclined peripheral portion on which seed from the hopper is deposited to be moved thereby to an outlet. Agitation and improved flow of the seed carried by the plate is achieved by mounting a flat disk on the seed plate to rotate with it having a diameter less than that of the seed plate but having a peripheral portion overhanging the downwardly inclined seed engaging portion of the seed plate.

---

This invention relates to seed planters and particularly to rotary seed control means for delivering seed from the container to a discharge outlet.

An object of the invention is to provide improved mechanism for discharging seed from a container with minimum injury to the seed.

Another object of the invention is the provision of improved seed metering apparatus having novel means for agitating and moving the seed from the container to a discharge outlet.

Other objects and advantages of the invention will become clear from the following detailed description when read in conjunction with the accompanying drawings wherein:

FIGURE 1 is a diagrammatic side elevation of a planter unit incorporating the features of this invention;

FIGURE 2 is a sectional view on an enlarged scale of a portion of the seed hopper and seed dispensing apparatus of this invention;

FIGURE 3 is a detail of a portion of the structure shown in FIGURE 2;

FIGURE 4 is an enlarged section taken on the line 4—4 of FIGURE 1;

FIGURE 5 is a sectional detail of a portion of the structure shown in FIGURE 2;

FIGURE 6 is a plan view on a smaller scale of the seed plate mechanism shown in FIGURE 5; and FIGURE 7 is an exploded view in perspective showing the relationship of parts of the seed dispensing and control mechanism of this invention.

A typical planter incorporating the seed dispensing mechanism of this invention is illustrated in FIGURE 1 and includes a seed hopper 10 having seed dispensing mechanism in its base generally indicated by the numeral 11 and driven from a shaft 12 connected by a chain 13 to a sprocket wheel 14 mounted on the axle 15 of a ground drive press wheel 16. Seed discharged from hopper 10 is conducted to the furrow formed in the ground by furrow opening means 17.

The hopper 10 is provided with stationary base means 18 including a bottom insert 19, having a hub portion 20 connected by ribs 21 to a rim 22, and a bottom ring 23 concentric with rim 22, and to which the container 10 is secured.

There is rotatably disposed below bottom insert 19 a seed plate 24, of dish shape, having circumferentially spaced lugs 25 affixed to and projecting downwardly from its lower surface for driving engagement with lugs 26 projecting upwardly from a ring gear 27 having an upwardly projecting bearing portion 28 seated in a recess 29 in hub 20. Ring gear 27 is centrally bored to receive a spindle 30 having a reduced diameter portion 31 mounted in a bearing housing 32 rotatably receiving drive shaft 12. A pinion 33 pinned to shaft 12 is provided with teeth 34 meshing with the teeth 35 of ring gear 27. Drive is thus transmitted from shaft 12 through pinion 33 to ring gear 27 to drive seed plate 24.

Seed plate 24 has a flattened inner portion 36 and a downwardly inclined annular outer portion 37 from the surface of which projections 38 extend upwardly at a location adjacent the periphery thereof.

Seed in hopper 10 rests upon a baffle 39 centrally affixed by a bolt 40 to an upwardly projecting portion 41 of the hub 20 of insert 19.

A segment 42 is cut out of baffle 39 to expose seed plate 24 to the seed and a portion of the edges of the cut-out portion are bent downwardly to form flanges 43 and 44 terminating adjacent a disk 45 disposed upon the flat inner portion of the seed plate 24 and having circumferentially spaced pins 46 affixed to and projecting downwardly from the lower face of the disk for reception in openings 47 provided in the seed plate to be driven therewith.

Seed in the hopper discharged through opening 42 onto disk 45 and the downwardly inclined outer portion of seed plate 24 is carried in the direction of the arrow shown in FIGURE 4 by the seed plate, with the assistance of the rounded projections 38, with minimum abrasion, into a triangularly shaped channel formed by the vertical inner wall 48 of insert 19, the lower edge of flange 43 and the inclined face 37 of the seed plate. The amount of seed passing through said channel under flange 43 is controlled by the provision of an adjustable cut-off assembly 49 comprising a bar 50 having vertical slots 51 therein to receive bolts 52 by which the cut-off is adjustably secured to flange 43. Bar 50 has a right angled extension 53 having an inclined edge 54 generally parallel to the inclined face 37 of the seed plate in the operating position of the cut-off shown in FIGURE 3.

In the position of the cut-off 49 shown in FIGURE 3, it is vertically adjustable to vary the spacing between edge 54 and face 37 of the seed plate in accordance with the size of the seed and the quantity to be metered. Seed flowing past the cut-off member is carried in a circular path to a discharge outlet indicated at 55 in FIGURE 4 from which seed passes downwardly by suitable guide means, not shown, to the furrow formed by the furrow opening device 17. Suitable seed deflecting means, not shown, may be provided adjacent the discharge outlet 55 to insure the passage of seed thereto.

Where minimum obstruction to the passage of the seed to the discharge outlet is desired, cut-off 49 is reversed to the position of FIGURE 2 with the angle extension 53 extending upwardly out of the path of the seed.

The rotation of the seed plate 24 and the engagement of the seed with projections 38 thereon carries the seed around to the discharge outlet. However, feeding of the seed by the seed plate is facilitated and the seed subjected to mild agitation without injury thereto by the construction and disposition of disk 45.

It will be observed that the diameter of disk 45 is less than that of the seed plate 24 but greater than the diameter of the flat inner portion 36 of the seed plate, so that an extension 56 is provided which overhangs a portion of the inclined face 37 of the seed plate forming a triangularly shaped recess 57 which is instrumental in providing the required agitation of the seed to maintain uniform flow.

It is believed that the construction and operation of the novel planter mechanism of this invention will be clearly understood from the foregoing description. It should likewise be understood that the invention has been described in its preferred embodiment, and that modifications may be made therein without departing from the spirit of the invention or the scope of the appended claims.

What is claimed is:

1. In a planter, a seed hopper, base means in the hopper having a discharge outlet, a seed plate rotatably mounted in the hopper overlying said base means, said seed plate having an inner portion and a downwardly inclined annular outer portion in communication with the seed in the hopper and with said outlet, and a flattened member rotatable with said seed plate having a radial dimension less than that of the seed plate and greater than the said inner portion thereof to provide a peripheral portion overhanging said downwardly inclined annular outer portion of the seed plate.

2. The invention set forth in claim 1, wherein a stationary circular seed-retaining baffle is mounted in the hopper above said disk having an opening therein exposing said flattened member and said seed plate to the seed in said hopper.

3. The invention set forth in claim 2, wherein said flattened member is a circular disk mounted on said seed plate for rotation therewith and the opening in said baffle is segmentally shaped to expose a segment of said disk and of said seed plate.

4. In a planter, a seed hopper, a stationary base plate in the hopper having a discharge outlet, a seed plate rotatably mounted in the hopper overlying said base plate, said seed plate having a flattened inner portion and a downwardly inclined annular outer portion in engagement with the seed in the hopper and having communication with said outlet, a disk mounted on said seed plate rotatable therewith having a diameter less than that of the seed plate and greater than the said flattened inner portion thereof to provide a peripheral portion overhanging said downwardly inclined annular outer portion of the seed plate, and a seed retaining stationary baffle overlying said disk having a diameter substantially coincident with the interior of the hopper and having a cut out portion exposing a segment of said disk and said seed plate to the seed in the hopper.

5. The invention set forth in claim 4 wherein projections are provided on the seed-engaging surface of the annular outer portion of said seed plate for engaging and impelling seed toward said outlet.

6. The invention set forth in claim 4 wherein the overhanging peripheral portion of said disk forms a triangularly shaped recess with the annular downwardly inclined outer portion of said seed plate.

7. The invention set forth in claim 6, wherein said base plate has an upwardly extending outer wall providing therebetween and said disk a channel through which seed passes to said outlet and a cut off gate mounted on said baffle projects into said channel to limit the flow of seed advanced by the seed plate to said discharge outlet.

8. The invention set forth in claim 7, wherein the lower edge of said cut off gate is angled to conform generally to the angle of the downwardly inclined outer portion of the seed plate.

References Cited

UNITED STATES PATENTS

| | | | |
|---|---|---|---|
| 1,964,176 | 6/1934 | Root | 222—410 X |
| 2,647,662 | 8/1953 | Oehler | 222—410 X |
| 3,229,860 | 1/1966 | Fabian | 222—370 X |

STANLEY H. TOLLBERG, *Primary Examiner.*